Nov. 28, 1967  U. H. KOCH ETAL  3,354,897

DIAPHRAGM VALVE WITH VENTING APERTURES IN BODY

Filed Oct. 12, 1964

INVENTORS.
ULRICH H. KOCH &
GARY A. SODERLUND
BY
*Fay & Fay*
ATTORNEYS

United States Patent Office 3,354,897
Patented Nov. 28, 1967

3,354,897
DIAPHRAGM VALVE WITH VENTING APERTURES IN BODY
Ulrich H. Koch, Pinole, and Gary A. Soderlund, Richmond, Calif., assignors to Whitey Research Tool Co., Emeryville, Calif., a corporation of California
Filed Oct. 12, 1964, Ser. No. 403,144
5 Claims. (Cl. 137—312)

This application relates to valves and more particularly to air operated diaphragm valves.

Air operated valves have been used for many years. In principle, air is allowed to act on a deflectable member which is connected to a blocking or valving means as, for example, a stem or poppet. As the deflectable member is actuated as, for example, by pressurized air, the valving means moves accordingly and opens or closes the main through passage in the valve. When the deflecting force is removed, a spring returns the valving means to its original position. Such valves may be of the normally open type or of the normally closed type.

These air operated valves are designed to carry a diversity of fluids ranging from liquids to gases. It is, however, essential that the system fluid being transported through the valve be prevented from mixing with the operating air. By the principles of this invention, a valve is provided which affords venting means strategically located such that in the event of failure in the system, mixture of the system fluid with the operating air will not occur.

Another problem which the prior art air operated valves have incurred has been the minimizing of the area in the valve which is exposed to the process fluid without decreasing the flow capacity of the valve. Through the principles of this invention, the volume inside the valve is kept to a minimum and the stem is designed such that only the lower end thereof is exposed to the process fluid.

An additional problem in air operated valves has been their adaptability to miniaturized systems. The valve disclosed herein is extremely compact, simple of construction, and economical to produce.

It is an object of this invention to provide an air operated valve that is either normally open or normally closed.

Another object of this invention is to provide a valve which includes in the design thereof means preventing intermingling of the operating air with the system fluid.

A further object of this invention is to provide an air operated valve wherein the valve and its mounting bracket are a single integrated unit.

A more specific object of the invention is to provide an air operated valve which includes a reciprocable stem with an O-ring seal at the bottom of the stem to minimize the exposure of the stem to the system fluid and thereby maintain the volume inside the valve to a minimum.

A still further specific object of the invention is to provide a valve comprising a body having inlet and outlet ports formed therein; a valve chamber interconnecting the ports and including a sealing seat; a bonnet having first and second concentric bores therein with the first bore opening through one end of said bonnet and the second bore opening through the other end of said bonnet; said bonnet being secured to said body with said first and second bores being coaxial with the valve chamber in said body and with one of said bores being in communication therewith; a stem extending through the bores in said bonnet into the valve chamber with one end of the stem extending upwardly of the bonnet; a flexible diaphragm member secured to the upper end of the stem; a cap threadedly secured to the bonnet and enclosing said diaphragm with the marginal edges of said diaphragm being clamped between said cap and said bonnet; spring means associated with the stem and diaphragm and biasing the stem toward one end position; and venting means interconnecting the valve chamber with the other of said bores in said bonnet and further venting means in said bonnet providing atmospheric pressure in said other of said bores.

To the accomplishment of the foregoing and related ends and objects, the following description sets forth in detail one approved means of carrying out the invention. Such disclosed means are not meant to be limiting inasmuch as it constitutes but one of the various ways in which the principles of the invention may be applied.

In the drawings wherein like reference numerals indicate like parts in the various views.

Figure 1:
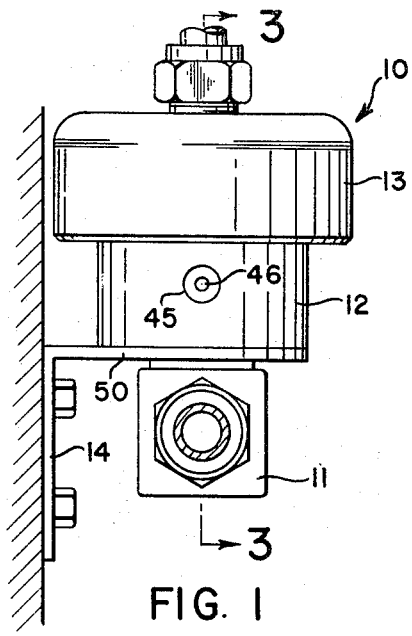
FIG. 1 is an end elevation view showing the valve supported on the bracket member.
Figure 2:
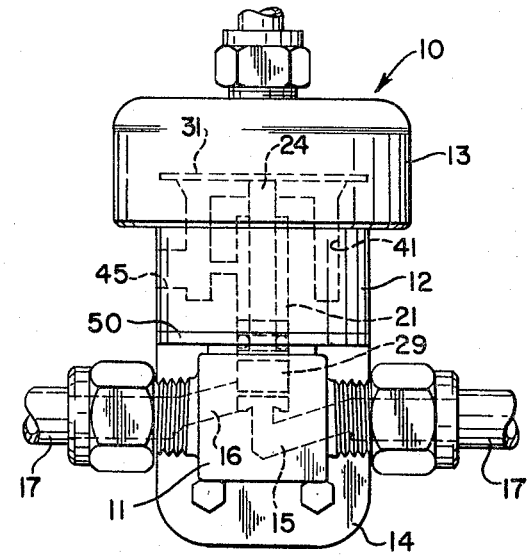
FIG. 2 is a side elevation view of the assembled valve.

Referring to the drawings and more particularly to FIG. 2, there is illustrated a valve, indicated generally by the reference numeral 10, which comprises the preferred embodiment of this invention. The valve 10 is composed of three major component parts, viz., the body 11, the bonnet 12 and the cap 13. In addition, a bracket 14 is designed to be an integral part of the valve and provide mounting means as shown in FIG. 1 for the valve assembly.

Figure 3:
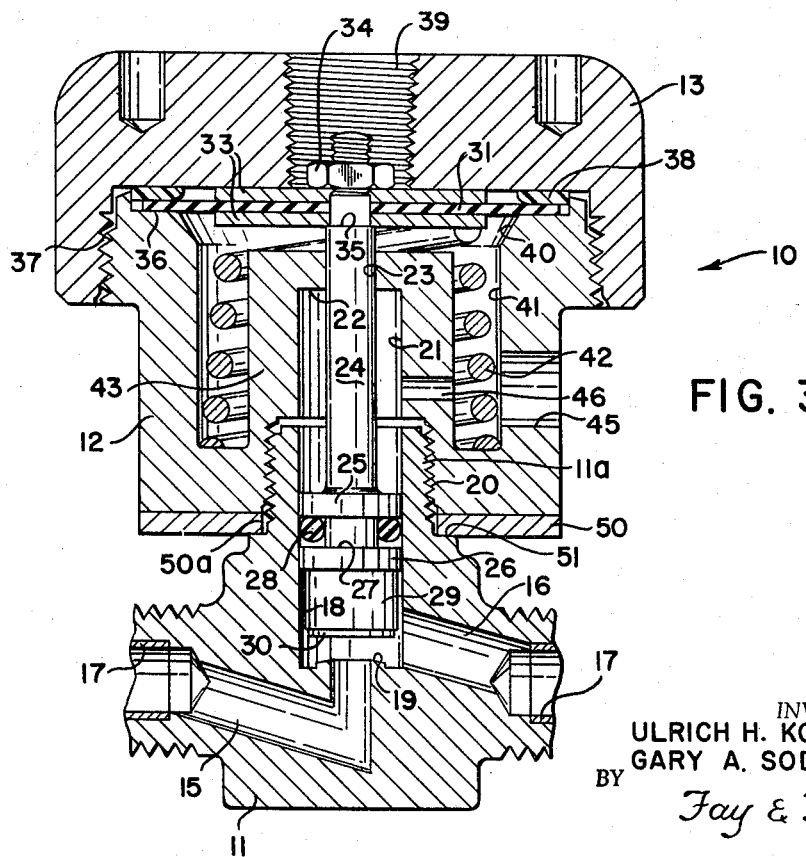
FIG. 3 is a section view taken along line 3—3 of FIG. 1 and illustrates the valve in the open position.

Turning to FIG. 3, the body 11 includes inlet and outlet ports or passags 15, 16 respectively. These passages are adapted to be connected by appropriate fittings to the fluid line 17. A valve chamber 18 interconnects the inlet and outlet passages and includes a valve seat 19. The valve chamber 18 opens upwardly from the body 11 with the bonnet 12 being threaded at 20 to a raised portion or boss 11a on the valve body. A central bore 21 in the bonnet 12 is coextensive with the valve chamber 18 and terminates in an end wall 22.

An aperture 23 in the end wall 22 is coaxial with the bore 21. A reciprocable stem member 24 passes through the aperture 23 and extends into the bore 21 and the valve chamber 18. The stem 24 includes a radially extending flange 25 intermediate its ends with the flange serving as a guide means for the stem in the chamber 18. A similar flange 26 on stem 24 is spaced from the first-mentioned flange 25 thereby defining a groove 27 in which there is received a sealing O-ring 28. The O-ring is dimensioned to engage the side walls of the valve chamber 18 and thereby isolate the process fluid in the valve chamber and the passages through the valve.

The stem 24 carries at its lower end a valving member 29 which includes a tip portion 30 adapted to engage the valve seat 19. The tip is ordinarily formed of Teflon or similar material and is adapted to seal against the seat 19 which is formed as shown in FIG. 3 with a bevelled surface so that the inside diameter of the orifice is at the highest point defined by the seat, with the remaining surface of the seat sloping away therefrom.

To reciprocate the stem 24, there is attached at the end of the stem opposite to the valve seat a deflectable member which is in the form of a flexible diaphragm 31. The diaphragm is secured at its central portion to the stem with a diaphragm support 33 interposed between the diaphragm and a lock nut 34 on the threaded end of the stem. A similar diaphragm support is on the underside of the diaphragm and supported by a shoulder 35 formed on the stem 24. The diaphragm is received in a recessed portion 36 formed in the upper end of the bonnet 12 and is retained in position by the cap 13 which is threaded at 37 to the exterior of the bonnet. The cap encloses the diaphragm 31 and exerts a compressive force through a retaining and sealing ring 38 on the marginal edges of the diaphragm to clamp the diaphragm against the bonnet 12.

An appropriate fluid inlet aperture 39 is formed in the top of the cap 13 and adapted to receive a fluid line thereby to introduce fluid pressure on the upper surface of the diaphragm. To accommodate flexure of the diaphragm when pressure is applied thereto, there is provided a recess 40 which defines a chamber under the diaphragm 31. An annular groove or cavity 41 is also formed in the bonnet 12 in communication with the recess 40. The groove 41 surrounds the bore 21 as shown in FIG. 3 with a wall 43 therebetween. Thus, it may be seen that the bonnet 12 is essentially comprised of a member having first and second coaxial concentric bores 21 and 40, 41, with the first bore 21 opening through one end of the bonnet and the second bore 40, 41 opening through the other end of said bonnet. With the bonnet secured to the body, both of the bores are coaxial with the valve chamber 18 and the bore 21 is in communication with the valve chamber.

A coil spring 42 is adapted to be received in the annular groove 41 with the spring having an inside dimension sufficient to be received over the wall 43 separating the bore 21 from groove 41. The coil spring 42 abuts the support for the diaphragm 31 and biases the diaphragm, and thereby the stem 24, to a position wherein the valving member 29 is spaced from the seat 19. Thus, it may be seen that the valve is normally in an open position. As will be understood by those having ordinary skill in the art, introduction of fluid pressure through the aperture 39 will cause deflection of diaphragm 31 into the recess 40. Concurrent movement of stem 24 will cause engagement of the valving member with the seat 19 to discontinue flow of fluid through the valve.

To provide a vent for the annular groove 41 and the chamber or recess 40, an aperture 45 is provided in the bonnet wall 12. By this expedient, the actuation of the diaphragm need only act against atmospheric pressure and spring 42. Another aperture 46 is provided in the wall 43. This aperture provides a means whereby any leakage of the process fluid along the stem 24 may be dissipated through the aperture 46 and to the atmosphere through opening 45. This assures a separation of the process fluid from the operating fluid in the event that either should be leaking. In addition, it provides a means whereby any leakage in the valve may readily be detected by the operating personnel. Yet, by placing the vent 46 in the interior of the valve and venting only indirectly to the atmosphere, the possibility of the operating personnel being sprayed by a corrosive fluid carried in the system is greatly diminished.

Absent an aperture such as 46, it would be necessary to provide an O-ring seal between the upper part of the stem 24 and the end wall 22 to prevent any leakage along the stem. In this connection, the placement and relative size of the aperture should be noted. Thus, the aperture 46 is placed above the threaded connection at 20 so that any fluid entering bore 21 through the aperture 46 may be dissipated through the threads of the joint rather than possibly leaking past the O-ring seal 28. Moreover, the aperture 46 is considerably smaller than the opening 45 so that any fluid accumulated in the cavity 41 will tend to be vented to the atmosphere rather than accumulate in the bore 21. An additional factor controlling the relative sizes of the apertures is the need to make opening 45 large enough to accommodate the greatest possible quantity of fluid capable of passing through aperture 46 in the event of failure of O-ring 28 and thereby avoid any accumulation of the process fluid in the cavity 41.

Adapted to be formed as an integral part of the valve assembly is the mounting bracket 14. The bracket is formed such that it provides a smooth coextension of the mating parts of the valve, with the supporting arm 50 of the bracket 14 having an aperture 50a through which projects the upper portion of the body. The bracket rests on a shoulder 51 formed on the body 11. With the bonnet threaded on the body, it is believed apparent that the bracket is clamped between the bonnet and the shoulder 51 on the body thereby providing a rigid interconnection.

Several features of the valve above described are to be noted. Thus, the provision of an O-ring at the lower end of the stem 24 provides a means whereby only the valving member 29 need be exposed to the process fluid. Moreover, the flanges 25, 26, being provided as they are at the lower end of the stem adjacent the seat and dimensioned to closely mate with chamber 18, assure proper alignment of the stem with the valve seat. Another feature is the provision of a venting aperture which vents the valve chamber by an aperture separate from the vent for the diaphragm chamber thereby assuring the separation of the process fluid from the operating fluid in the event of leakage of either.

Modifications and changes will suggest themselves to those having ordinary skill in the art; however, changes such as these are contemplated by the principles of the invention so that although for ease of description, the principles have been set forth in connection with but a single illustrated embodiment, it is not intended that this illustrated embodiment or the terminology employed in describing it is to be limiting; but rather, it is our desire to be restricted only by the scope of the appended claims.

We claim:

1. A valve comprising a body having inlet and outlet ports formed therein;

a generally cylindrical valve chamber in said body interconnecting said ports and including a sealing seat;

a bonnet secured to said body;

a central bore in said bonnet defined by a cylindrical side wall and an end wall;

the bore in said bonnet being generally coaxial with and opening toward the valve chamber in the body;

a valving member comprising a valve head slidably received in said valve chamber in both the open and closed positions of said valve, and a valve stem extending through the central bore in said bonnet and slidably received through a bore provided in said end wall with the free end of the valve stem extending therebeyond;

a flexible diaphragm member secured to the valve stem adjacent the free end thereof and being protected by said end wall from any escaping process fluid;

a cap member enclosing said diaphragm and secured to said bonnet with the peripheral portions of said diaphragm being clamped between the cap member and said bonnet;

an annular chamber in said bonnet concentric with said central bore and separated therefrom by the said side wall;

said annular chamber opening in the direction opposite the direction in which the central bore in the bonnet opens;

spring means in said annular chamber with one end of said spring means operatively interconnected with said diaphragm thereby biasing said diaphragm and said stem in one direction;

fluid passage means in said cap member whereby fluid pressure may be introduced against said diaphragm thereby to overcome the bias of said spring means;

a first venting aperture through the side wall separating said central bore from said annular chamber and disposed between the valve head and the end wall of the bore in the bonnet; and a second aperture in said bonnet venting said annular chamber to the atmosphere.

2. The valve of claim 1 further characterized in that it includes:

a mounting bracket having an aperture therein;

a portion of said body extending through the aperture in the bracket;

a shoulder formed on said body adjacent said portion with said bracket abutting said shoulder whereby the engagement of said bonnet and said body clamps said bracket therebetween to form an integral unit.

3. The valve of claim 1 further characterized in that the valve head includes a sealing means cooperatively engaging the valve chamber to prevent the process fluid from normally entering the central bore in the bonnet.

4. The valve of claim 1 further characterized in that the second aperture is at least as large as the first aperture.

5. The valve of claim 1 further characterized in that the fluid passage means in the cap member comprises an opening which overlies the diaphragm and is spaciously situated with respect thereto so that the spring means biases the diaphragm in the direction of the opening.

References Cited

UNITED STATES PATENTS

| 2,468,385 | 4/1949 | Voss | 251—61 X |
| 2,897,836 | 8/1959 | Peters et al. | 251—61 X |
| 3,080,889 | 3/1963 | Noakes | 137—270 X |
| 3,241,805 | 3/1966 | Schumann | 25—61 |

FOREIGN PATENTS

| 1,343,747 | 10/1963 | France. |
| 614,654 | 1/1961 | Italy. |

M. CARY NELSON, *Primary Examiner.*

A. ROSENTHAL, *Examiner.*